United States Patent [19]

Kaneko et al.

[11] 3,945,577

[45] Mar. 23, 1976

[54] METHOD AND APPARATUS FOR HELICALLY WINDING WIRE ON A RING-SHAPED CORE

[75] Inventors: Fuminori Kaneko; Kashirou Ureshino; Masahiro Tomita, all of Kobe, Japan

[73] Assignee: Kobe Steel, Ltd., Kobe, Japan

[22] Filed: June 24, 1974

[21] Appl. No.: 482,621

[30] Foreign Application Priority Data
June 23, 1973 Japan................................. 48-71021

[52] U.S. Cl............................... 242/4 C; 242/7.02
[51] Int. Cl.².......................................... B65B 81/02
[58] Field of Search.......... 242/4 C, 4 A, 4 B, 4 BE, 242/4 R, 6, 7.02, 7.03; 140/92.2

[56] References Cited
UNITED STATES PATENTS

| | | | |
|---|---|---|---|
| 1,610,468 | 12/1926 | Pullets................................. | 242/4 C |
| 3,050,266 | 8/1962 | Bacalo ................................ | 242/4 C |
| 3,383,059 | 5/1968 | Fahrbach ............................ | 242/4 B |

*Primary Examiner*—Edward J. McCarthy
*Attorney, Agent, or Firm*—Oblon, Fisher, Spivak, McClelland & Maier

[57] ABSTRACT

The present invention comprises a method of helically winding wire on an endless ring-shaped core, and an apparatus used for practicing such method, which feature novel means for fixing the wire to the core when coiling the former on the latter. Heretofore, fixing of the wire to be wound to the core has been accomplished by either soldering the end of the wire to the core or by manually holding the wire end, but these methods are poor in working efficiency and reliability. According to the present invention, the wire is securely fixed to the core by projecting the leading end of the wire in a direction pointing away from the section of contact with the core and holding the same against rotation about the circumferential line of the core with a guide disposed about the core periphery and having transfer means thereon for permitting passage of the wire therethrough.

13 Claims, 16 Drawing Figures

METHOD AND APPARATUS FOR HELICALLY WINDING WIRE ON A RING-SHAPED CORE

BACKGROUND OF THE INVENTION

This invention relates generally to an improved method of helically winding wire on an endless ring-shaped core and an apparatus for practicing such method, and more particularly to a method of and an apparatus for fixing the wire end to the core before winding the wire on the core.

The use of a machine for helically winding wire on a ring-shaped core has been proposed heretofore, for example, in U.S. Pat. No. 1,570,821. This patent discloses means for accomplishing helical winding of wire on a ring-shaped core by revolving the ring-shaped core in its peripheral direction while simultaneously rotating the wire drum relatively to the core so that the drum will turn around a part of the core and will also pass through the ring of the core. However, the patent makes little explanation of the manner in which the leading end of the wire is or may be fixed to the core before commencing the winding of the wire thereon.

Generally, fixing of the leading end of the wire to the core is practiced in one of the following ways:

i. The worker holds with his hand the leading end of the wire on the core until the wire is sufficiently wound on the core to secure the leading end of the wire against becoming loose thereon; and ii. The leading end of the wire is temporarily joined to the core by soldering or other similar means.

However, these methods also involve many defects and difficulties which hamper productivity of the ring-shaped core having a helical winding thereon. That is, in the case of manual fixing as mentioned in (i) above, since the core must be revolved in its peripheral direction, the worker himself must go round the core while grasping the foremost end of the wire and a part of the core. This is extremely troublesome and also makes it impossible to attain the best winding effect of the machine. On the other hand, in the case of the soldering method mentioned in (ii), such problems arise as the soldering work itself requiring much time, the work being difficult and requiring skill and experience, and finally solder must be removed following completion of the winding. Thus, either of these methods is bad from the view of workability and also from the view of being low in reliability. Further, in view of the fact that formation of the winding layers is governed by the delicate positional relation between the wound wire and its foremost end, it must be said that it is practically impossible to perform such winding, that is, to produce the ring-shaped helical beads, on a mass production scale with a machine by using such conventional techniques having such poor reliability.

SUMMARY OF THE INVENTION

Accordingly, it is an object of the present invention to effectuate secure fixing of the wire end to the core before winding the wire on the core without resorting to manual labor or soldering in producing ring-shaped cores having helically wound wire thereon.

Another object of the present invention in producing such ring-shaped cores having helically wound wire thereon is to prevent the wire end being fixed to the core from obstructing movement of the wire portion which is being wound on the core.

Still another object of the present invention is to ensure secure fixing of the wire end to the core even when the wire end is so arranged as it will not obstruct movement of the wire portion which is being wound.

Yet another object of the present invention is to permit easy setting of the positional relation between the end of the wire portion to be wound and the wire portion which is being wound on the core.

According to one aspect of the present invention, the foregoing and other objects are achieved through the provision of a method of helically winding a wire on a ring-shaped core by revolving the core in its peripheral direction while rotating the wire drum, on which wire is wound in reserve, relatively to the core, so that the wire drum will pass around a part of the core and also through the core ring, which comprises the steps of projecting the leading end of the wire in a direction in which it points away from the point of contact with the core, retaining the leading end of the wire by a guide disposed along the locus of revolution of the core so that the leading end of the wire will not rotate around the core in its peripheral direction, and then moving the leading end of the wire along the guide in accordance with revolution of the core, and thereby helically winding the wire on the core.

According to another aspect of the present invention, there is provided an apparatus for practicing the method described herein which comprises a mechanism for revolving the ring-shaped core in its peripheral direction, a mechanism for rotating the wire drum relative to the core so that the wire drum will pass around a part of the core and through the circle described by the ring-shaped core, and a guide provided along the locus of revolution of the core for guiding the leading end of the wire to be wound, the guide being arranged so as not to permit the leading end of the wire to rotate around the core in its peripheral direction but to allow non-rotatable movement of the wire end along the circumference of the core, and having at a part thereof a transfer section designed to allow passage of the wire therethrough.

According to the present invention, therefore, as understood from the features thereof set forth herein, the leading end of the wire to be wound moves forward in accordance with revolution of the core, but is held by a guide against rotating around the core in its peripheral direction, so that the desired secure fixing of the wire to the core can be effectuated without requiring any human hand or soldering or other similar means. This permits production of ring-shaped helical beads in a practical manner in commercial quantity.

BRIEF DESCRIPTION OF THE DRAWINGS

Various other objects, features and attendant advantages of the present invention will be more fully appreciated as the same becomes better understood from the following detailed description when considered in connection with the accompanying drawings, wherein like reference numerals designate like or corresponding parts through the several figures, and in which:

FIG. 5 is an enlarged view showing the details of the transfer section of the embodiment of FIG. 4;

DETAILED DESCRIPTION OF THE PREFERRED EMBODIMENTS

Figure 1:
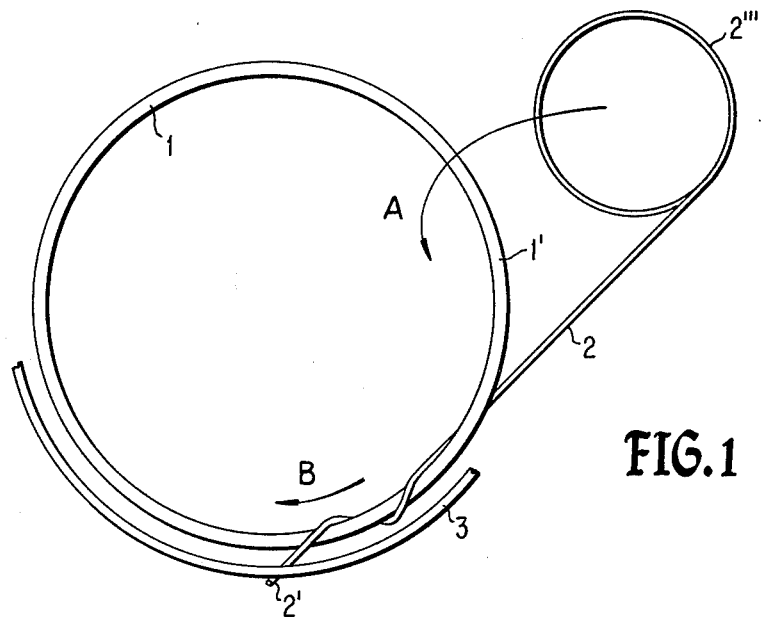
FIGS. 1 to 3 are schematic drawings illustrating the fundamental conception of the present invention.
Figure 2:
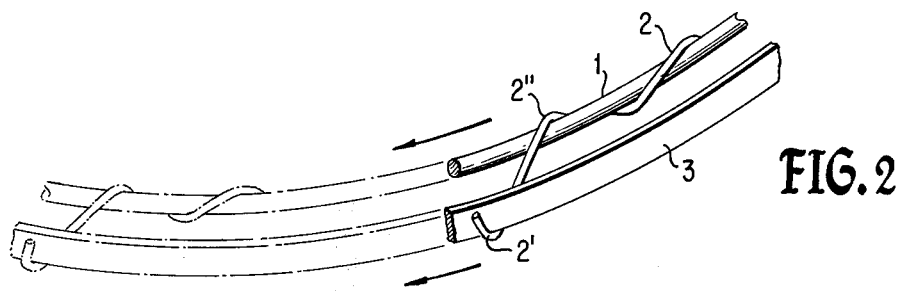
Figure 3:
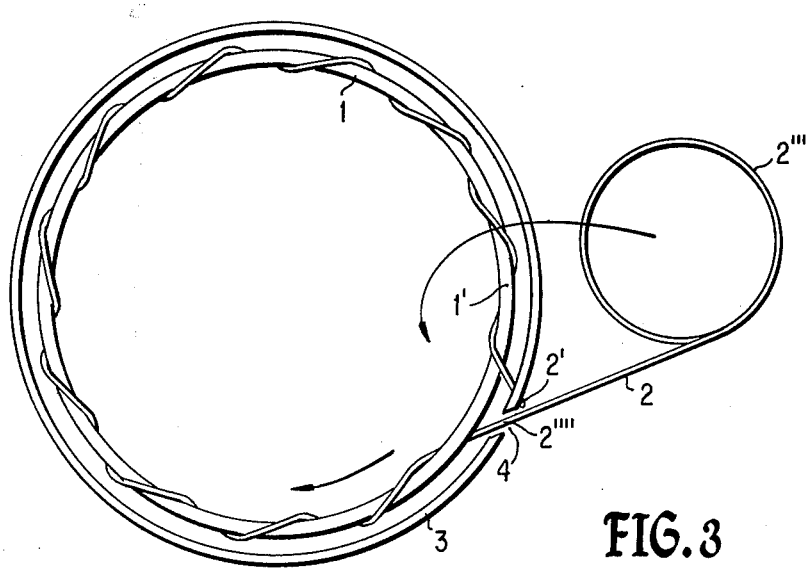

Referring now to the Drawings, and more particularly to FIGS. 1 to 3, the fundamental concept of the present invention is depicted, particularly the movements of the core 1 and the wire 2 to be wound on the core and the behavior of the wire end guide 3, which according to this invention is concentrically positioned about the core 1. It will be noted that a leading end 2' of the wire 2 extends in a direction pointing outward from the circle of the core and away from the section of contact 2'' with the core 1, and is bent or hooked so as to be caught by the guide 3 provided along the locus of revolution of the core 1. The wire portion 2''' wound upon a drum or such in the form of a roll is moved so as to pass around a part 1' of the core 1 and through the ring of the core, as shown by an arrow A in FIG. 1, and at the same time, the core 1 itself also revolves in the direction of an arrow B. Such movement of the wire portion 2''' and revolution of the core 1, when combined, causes the wire 2 to be helically coiled on the core. At this time, the leading end 2' of the wire 2 slides along the guides 3 synchronously with revolution of the core 1. As a result, the leading end 2' of the wire 2 will not be wound back in the peripheral direction, or around the axis, of the core 1 and the wire 2 is thus fixed to the core 1. As shown in FIG. 3, the guide 3 is provided with a transfer section 4 which accommodates passage of the wire 2'''' which is being wound, when the wire portion 2''' makes movement around the part 1' of the core 1. This transfer section 4, as will be described in detail hereinafter, is designed to transfer the leading end 2' without liberating it while allowing passage of the wire portion 2'''' therethrough.

In this way, the wire 2 is fixed to the core 1 and is helically wound thereon with no need of manually holding the wire end 2' or soldering it to the core 1.

Figure 4:
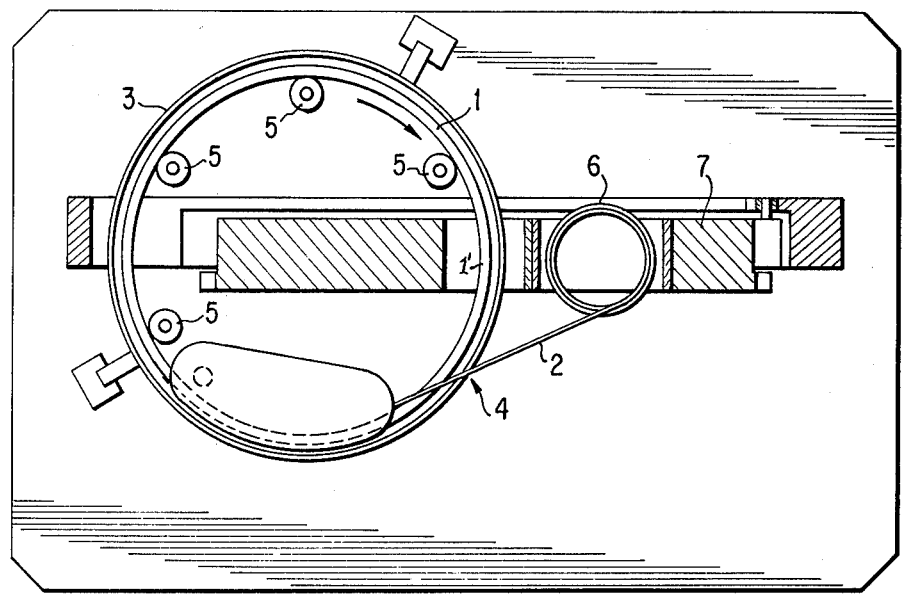
FIG. 4 is a sectional view of an apparatus embodying the present invention.

Referring now to FIG. 4, there is shown a preferred embodiment of the apparatus used for practicing the method described above according to the present invention. This apparatus includes a mechanism 5 for revolving the core 1 in its circumferential direction about the axis thereof, the mechanism being provided along a part of the circumference of the core 1, and a rotative structure 7 carrying a rotary wire drum 6 on which a reserve supply of the wire 2 is wound. The rotative structure 7 is arranged to rotate about the part 1' of the core 1 in a plane perpendicular to the surface of the drawing sheet. Thus, the wire drum 6 makes rotating movement around the part 1' of the core 1 and also through the ring of the core, thereby helically coiling the wire 2 on the core 1 while allowing continuous feed of the wire 2.

It will be seen that a wire guide 3 is provided along the outer periphery of the core 1, the guide being provided at a part thereof with a transfer section 4 designed to allow passage of the wire 2 therethrough.

Figure 6:
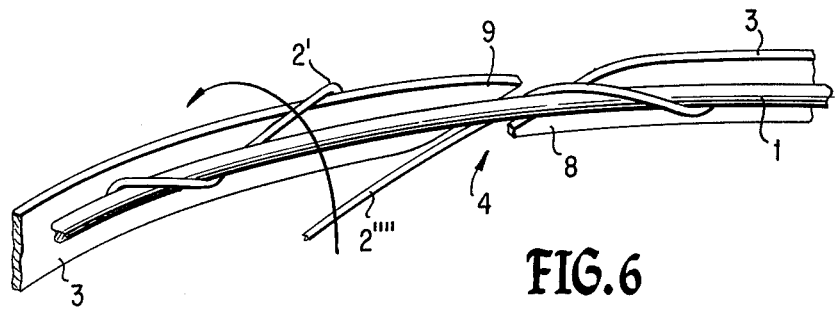
FIGS. 6 and 7 are a perspective view and a partial perspective view, respectively, of the transfer section shown in FIG. 5.
Figure 7:
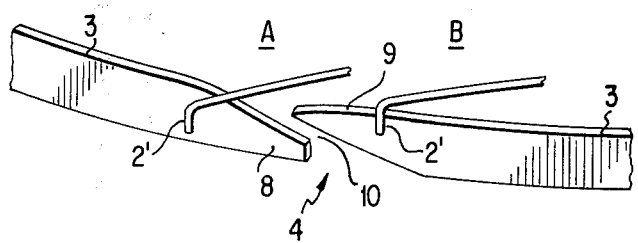

Turning to FIGS. 5 - 7, the guide 3 is formed from a continuous protuberant strip designed to facilitate catching of the leading end 2' of the wire 2, and the transfer section 4 in the guide 3 is composed of a receiving contact portion 8 describing a curve continuous to the guide 3 and a guide end portion 9 which projects to overlap with but being slightly spaced apart from the receiving portion 8, thereby forming a slit 10 between the portions 8 and 9, such slit 10 accommodating passage of the wire portion 2'''' which is just about to be wound on the core 1.

In the operation of this embodiment of the present invention, first the core 1 is properly set in the mechanism 5 and then the leading end 2' of the wire 2 is drawn out from the drum 6 and is bent and caught by the guide 3 past the core 1. The wire 2 is firmly fixed on the core 1 since the elasticity of the wire 2 makes its contact with the surrounding surface of the core 1 under pressing force which occurs while the wire 2 is bent. Then the mechanism 5 and the rotative structure 7 are driven to let the core revolve in its circumferential direction, about its axis, while causing the wire 2 to move around a part of the core 1 and through the ring thereof, whereby the leading end 2' of the wire 2 is allowed to move circumferentially with the core 1 along and retained by the guide 3. Since the wire 2 itself is securely fixed to the core 1, the wire 2 is continuously wound helically on the core 1. When the leading end 2' of the wire makes a complete revolution and arrives at the transfer section 4, the end 2' is freed downwardly from the guide end portion 9, but it is no sooner released from the end portion 9 than it is received and sustained on the receiving portion 8, and thus is is immediately returned to its position on the guide 3 wherein it is retained thereby against peripheral motion about the core as the core 1 revolves. Thus, the leading end 2' of the wire moves continuously along the guide without the bent portion changing its direction or orientation relative thereto by passing through a slit 10 formed in the transfer section 4 of the guide 3. Thus, the wire end 2' is transferred from the condition of B to the condition of A in FIG. 7, instead of passing through the slit 10. Also, since the wire portion 2'''' being wound on the core 2 passes through the slit 10, the presence of the guide 3 offers no hindrance to the continuous feeding of the wire onto the core 1.

It is thus possible to positively obtain a desired ring-shaped bead through continuous movement of the leading end 2' of the wire 2 and rotation of the wire portion 2'''' in the manner described above.

Figure 8:
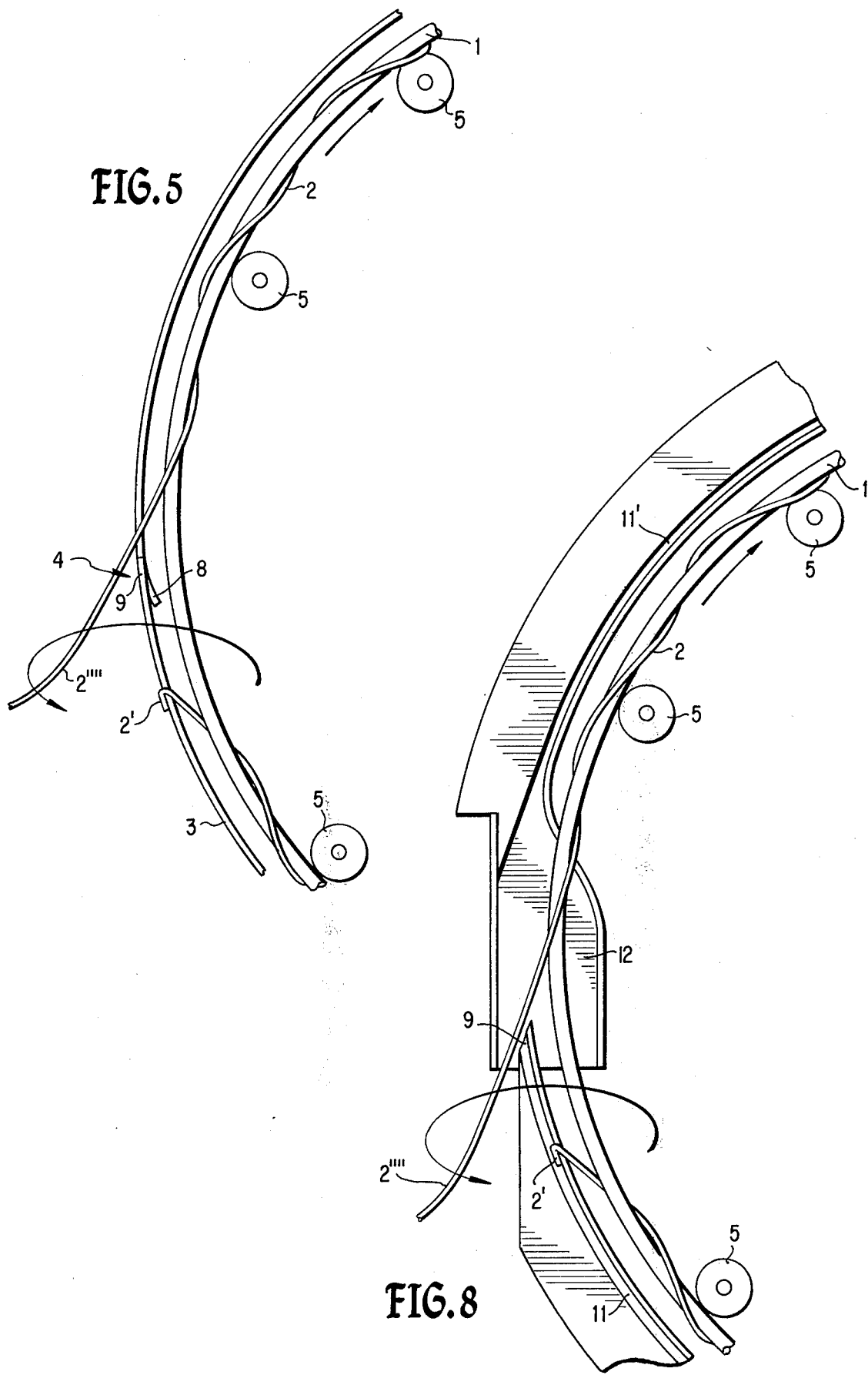
FIGS. 8 to 10 are a plan view and perspective views, respectively, showing modifications of the transfer section of FIG. 5.

Referring now to FIG. 8, there is shown another embodiment of the transfer section. In this embodiment, a groove or channel 11 is provided in the guide 3 and the end bent portion of the wire end 2' is placed within this channel. The receiving contact portion 12 is dish-shaped and is connected to a channel portion 11' thereof with a curve continuous thereto. In this case, too, the wire end 2' freed downwardly from the tip of the guide end portion 9 and is immediately received on the dish-shaped receiving portion 12 and thus, directly returned or guided into the channel 11'. The behaviors of the leading end 2' of the wire 2 and the wire portion 2'''' are substantially the same as in the previous embodiment shown in FIG. 5, thus allowing continuous and positive winding of the wire.

Figure 9:
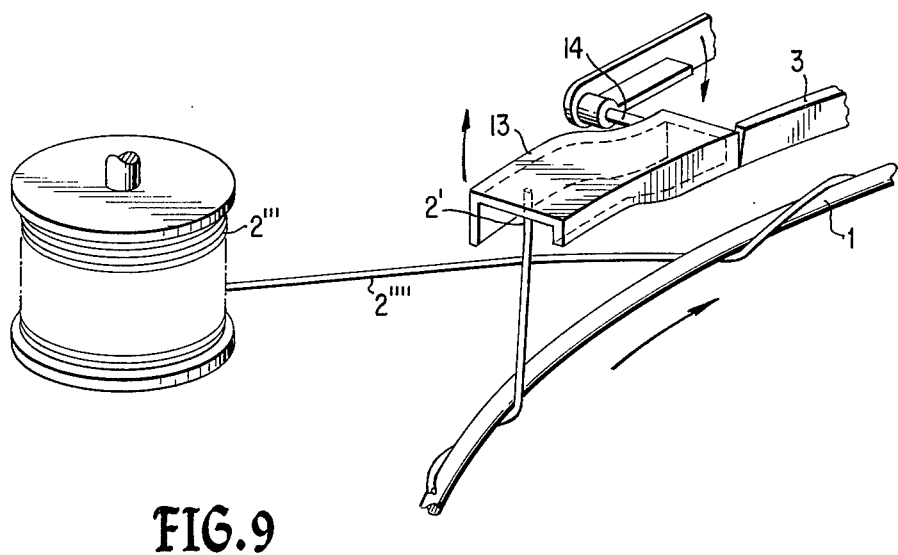

FIG. 9 shows still another embodiment of the transfer section in which a receiving contact member 13 is arranged to be pivotable about a shaft 14 to allow optional adjustment of the position at which the wire end 2' is received on the receiving member. This movable arrangement of the receiving member 13 eliminates any possibility of collision between, for example, the wire portion 2'''' and the wire end 2'.

Figure 10:
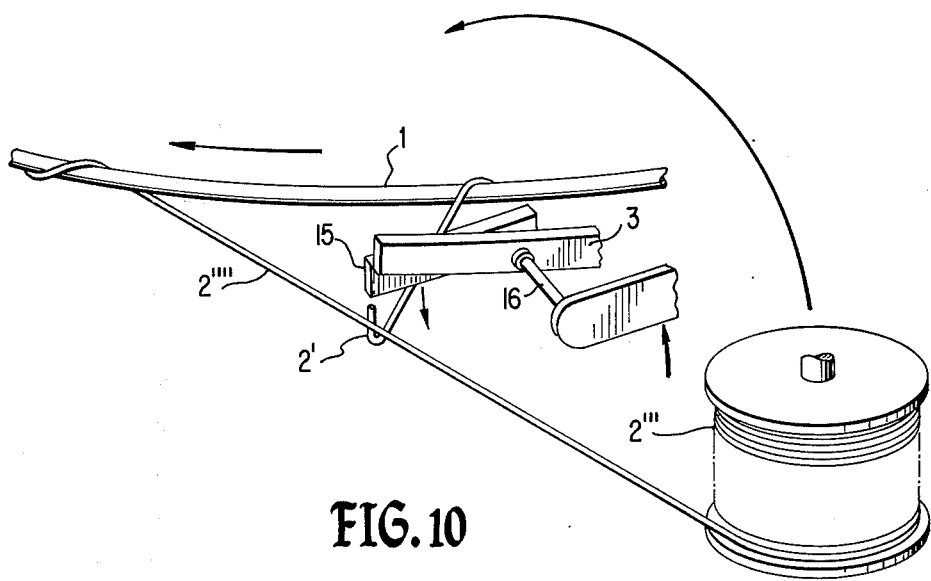

In still another embodiment shown in FIG. 10, a guide end portion 15 is arranged to be pivotable about a shaft 16 so as to allow optional setting of the position at which the leading wire end 2' is freed from the guide end portion 15. Owing to this movable arrangement of the guide end portion 15, it is possible to select at will either to release the wire end 2' onto the respective receiving member 8, 12 or 13 after the wire portion 2'''' has passed the wire end 2' or to effect such release before the portion 2'''' passes the end 2'. Such free selection is greatly significant in easily allowing optional control of the relative location of the portion 2'''' to the wire 2 which has been wound on the core 1 in the manufacture of ring-shaped helical beads. In either case, correct and positive control of the positional relation between the wire 2 and the core 1 can be accomplished by arranging either or both of the receiving member 13 and guide end portion 15 to be movable in the manner indicated.

Figure 11:
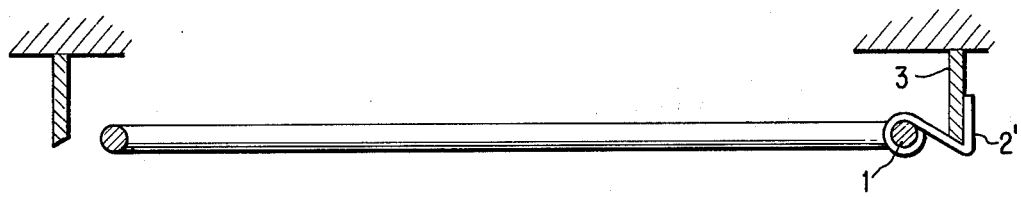
FIG. 11 is a sectional view of the wire end guide in the embodiment of FIG. 4.
Figure 12:
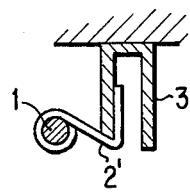
FIGS. 12 to 16 are sectional views showing modifications of the wire end guide and their relations of engagement with the wire end.
Figure 13:
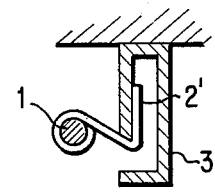
Figure 14:
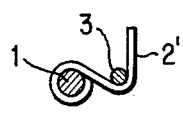
Figure 15:
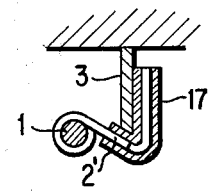
Figure 16:
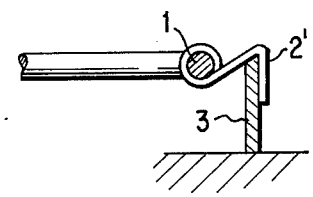

FIG. 11 shows a sectional view of the guide 3 being formed from a continuous protuberant strip used in the embodiment of FIG. 4. The section configuration of the guide, however, is not restricted to that shown in this figure, but it may be channel-shaped, as in FIGS. 12 and 13, or bar-shaped as in FIG. 14. Also, as shown in FIG. 15, the leading end 2' of the wire 2 may not be bent, but may be mounted with a cap 17 adapted to be fitted with the guide 3 to thereby retain the guide in position. It will be apparent that if the direction of winding of the wire 2 is reversed, the direction of the guide 3 is also reversed, as shown in FIG. 16.

As described above, it is possible with the present invention to securely fix the wire to the core with no need of using human hands or soldering or other similar means. Also, the leading end of the wire and the wire portion which is about to be wound can freely move without interfering with each other. Rather, such relation proves helpful to ensure correct and secure winding of the wire on the core. Such secure, correct and easy fixing of the wire to the core practically enables the manufacture of ring-shaped helical beads by machine.

Obviously, many modifications and variations of the present invention are possible in light of these teachings. It is therefore to be understood that within the scope of the appended claims, the invention may be practiced otherwise than as specifically described herein.

What is claimed as new and desired to be secured by Letters Patent of the United States is:

1. A method of helically winding a wire on a ring-shaped core by revolving the core circumferentially about its axis while rotating a wire drum having a reserve supply of wire thereon relatively to the core so that said wire drum moves around a part of the revolving core while passing through the ring thereof, said method further comprising the steps of:

projecting the leading end of the wire in a direction pointing away from the leading section of contact of said wire with the core;

securing said leading end of the wire to a guide member disposed along the locus of revolution of the core, so that said wire end will not rotate about the circumferential line of the core; and moving said leading end of the wire along said guide in accordance with revolution of the core and thereby helically winding the wire on the core.

2. The method as set forth in claim 1, further comprising bending said leading end of the wire before projecting it in said direction.

3. The method as set forth in claim 1, further comprising fixing a cap adapted to be engaged with said guide to said leading end of the wire and then projecting said end of the wire in said direction.

4. An apparatus for helically winding a wire on a ring-shaped core by revolving the core circumferentially about its axis while rotating a wire drum having a reserve supply of wire thereon relatively to said core so that said wire drum will move around a part of the revolving core while passing through the ring thereof, comprising:

a mechanism for revolving the ring-shaped core circumferentially about its axis;

a mechanism for rotating the wire drum relatively to the core so that said wire drum will move around a part of the revolving core while passing through the ring thereof; and guide means disposed substantially continuously along the entire locus of revolution of the core, for slidably securing the leading end of the wire thereon and for allowing movement of the leading end of the wire circumferentially along with the core relative to said guide means but inhibiting rotation of said wire end around the core transversely to the circumferential direction thereof, said guide means also having at a part thereof a transfer section designed to allow passage of the wire therethrough.

5. The apparatus as set forth in claim 4, wherein said transfer section is composed of a receiving contact member describing a curve continuous to the guide means and a guide end portion projected to overlap but being slightly spaced apart from said receiving contact member.

6. The apparatus as set forth in claim 5, wherein said receiving contact member is pivotably disposed for pivotable movement along a line substantially perpendicular to the plane of the ring-shaped curve.

7. The apparatus as set forth in claim 5, wherein said guide end portion is pivotably disposed for pivotable movement along a line substantially perpendicular to the plane of the ring-shaped curve.

8. The apparatus as set forth in claim 5, wherein both of said receiving contact member and said guide end portion are pivotably disposed for pivotable movement along a line substantially perpendicular to the plane of the ring-shaped curve.

9. The apparatus as set forth in claim 5, wherein said receiving contact member is dish-shaped.

10. The apparatus as set forth in claim 4, wherein said guide means is formed from a continuous protuberant strip.

11. The apparatus as set forth in claim 4, wherein said guide means is provided with a channel for receiving said leading end of said wire.

12. The apparatus as set forth in claim 4, wherein said transfer section is composed of a receiving contact member describing a curve continuous to said guide means and a guide end portion projected to overlap with but being slightly spaced apart from said receiving contact member.

13. The apparatus as set forth in claim 4, wherein said transfer section is composed of a portion of said guide means and includes a slit through which the wire portion being wound on the core passes.

* * * * *